US009615268B2

(12) United States Patent
Navarro et al.

(10) Patent No.: US 9,615,268 B2
(45) Date of Patent: Apr. 4, 2017

(54) METHOD FOR ACCESS POINTS SCHEDULING FOR BACKHAUL AGGREGATION IN A TELECOMMUNICATIONS NETWORK AND A DEVICE

(71) Applicant: TELEFONICA DIGITAL ESPANA, S.L.U., Madrid (ES)

(72) Inventors: Fernando Navarro, Madrid (ES); Xiaoyuan Yang, Madrid (ES); Eduardo Iha, Madrid (ES)

(73) Assignee: TELEFONICA DIGITAL ESPANA, S.L.U, Madrid (ES)

( * ) Notice: Subject to any disclaimer, the term of this patent is extended or adjusted under 35 U.S.C. 154(b) by 151 days.

(21) Appl. No.: 14/537,120

(22) Filed: Nov. 10, 2014

(65) Prior Publication Data

US 2015/0131468 A1    May 14, 2015

(30) Foreign Application Priority Data

Nov. 11, 2013    (EP) .................................... 13382451

(51) Int. Cl.
*H04J 1/16*    (2006.01)
*H04W 24/02*    (2009.01)
(Continued)

(52) U.S. Cl.
CPC ........... *H04W 24/02* (2013.01); *H04L 41/147* (2013.01); *H04W 72/1252* (2013.01);
(Continued)

(58) Field of Classification Search
USPC ........ 370/216–252, 279–315, 465–477, 338; 709/229–241
See application file for complete search history.

(56) References Cited

U.S. PATENT DOCUMENTS 7,688,835 B2 *    3/2010  Kotzin ................. H04L 1/0625
                                                    370/252
7,720,094 B2 *    5/2010  Turner .................... H04L 47/10
                                                    370/464
(Continued)

FOREIGN PATENT DOCUMENTS

EP    2 263 398 B1    7/2013
WO    2006/099025 A2    9/2006
(Continued)

OTHER PUBLICATIONS

Extended European Search Report of EP 13382451.6 dated Feb. 7, 2014.

*Primary Examiner* — Man Phan
(74) *Attorney, Agent, or Firm* — Sughrue Mion, PLLC

(57) ABSTRACT

In the method, a plurality of access points forming a cluster in a telecommunication network monitor network data traffic information from at least one user computing device connected thereto; report an own identifier and a used public IP to a remote server recording them; establish connections between access points in said cluster by mapping the own identifier with said public IP; determine its internal status and state of the connection of said at least one monitored user computing device; generate, each certain time-frequency, a profile; calculate, in a determined time T1, a forecast of future requirements of the own access point and send to one access point of said plurality acting as a cluster coordinator said calculated forecast, wherein said coordinator defines a routing path through carrying out associations of access points to which perform the backhaul aggregation.

12 Claims, 2 Drawing Sheets

(51) Int. Cl.
*H04W 72/12* (2009.01)
*H04W 40/32* (2009.01)
*H04W 88/08* (2009.01)
*H04L 12/24* (2006.01)
*H04L 29/12* (2006.01)

(52) U.S. Cl.
CPC ............ *H04L 41/142* (2013.01); *H04L 41/16* (2013.01); *H04L 61/15* (2013.01); *H04W 40/32* (2013.01); *H04W 88/08* (2013.01)

(56) References Cited

U.S. PATENT DOCUMENTS

| | | | |
|---|---|---|---|
| 8,248,949 B2* | 8/2012 | Ozer ..................... | H04W 84/22 370/237 |
| 8,442,003 B2 | 5/2013 | Stamoulis et al. | |
| 8,798,021 B2* | 8/2014 | Mangalvedhe ....... | H04W 24/02 370/338 |
| 9,007,900 B2* | 4/2015 | Collings ........... | H04W 72/0486 370/206 |
| 9,155,013 B2* | 10/2015 | Vargas Bautista .... | H04W 28/08 |
| 9,276,718 B2* | 3/2016 | Llairo ................... | H04W 28/08 |
| 2006/0064497 A1 | 3/2006 | Bejerano et al. | |
| 2008/0049672 A1 | 2/2008 | Barak et al. | |
| 2009/0213730 A1 | 8/2009 | Zeng et al. | |
| 2013/0208589 A1* | 8/2013 | Lopez Toledo ..... | H04W 72/087 370/230 |
| 2015/0117210 A1* | 4/2015 | Yang ..................... | H04W 24/02 370/235 |
| 2015/0319644 A1* | 11/2015 | Grunenberger ....... | H04W 88/10 370/338 |
| 2016/0050684 A1* | 2/2016 | Ni ......................... | H04W 72/12 370/329 |

FOREIGN PATENT DOCUMENTS

| WO | 2009/039012 A1 | 3/2009 |
|---|---|---|
| WO | 2009/113976 A1 | 9/2009 |
| WO | 2012/034702 A1 | 3/2012 |
| WO | 2013/011088 A1 | 1/2013 |

* cited by examiner

METHOD FOR ACCESS POINTS SCHEDULING FOR BACKHAUL AGGREGATION IN A TELECOMMUNICATIONS NETWORK AND A DEVICE

FIELD OF THE INVENTION

The present invention is directed, in general, to wireless communications, and more particularly to a method for scheduling Access Points for backhaul aggregation in a telecommunications network and a device.

BACKGROUND OF THE INVENTION

Wireless Local Area Network (WLAN) technology is being globally used. Driven by the market needs, subsequent WLAN protocol standards have be defined for medium access control and physical layer. IEEE released the original 802.11 protocol, RFC5416 in 1997 and up to six more versions have been published until then aimed to increase both the capacity and the signal coverage distance. In 2014, 802.11ad is published to provide a theoretical maximum data throughput of up to 7.0 Gbps.

Consumer broadband Internet access technologies is experimenting a notable slowing down in new breakthroughs. The new ADSL2++ (52.0 Mbps downstream rate) is still in development. Although the fibre technology provides an alternative, the higher infrastructure deployment cost makes it less attractive for ISPs.

Several methods try solving this situation by bundling the capacity of individual network links to create a single connection that is more performing and/or more resilient to failure.

Previous methods can aggregate backhaul connectivity using wireless links. Descriptions of aspects such as multiple connections with a single radio such as the method described in patent application WO-A1-2012/034702, or by means of a fair WLAN backhaul aggregation [1] has been described.

[1] "Fair WLAN Backhaul Aggregation", Domenico Giustiniano, Eduard Goma, Alberto Lopez Toledo, P. Rodriguez, ACM/MOBICOM'10, September 2010.

In order to coordinate and improve the resulting service, other patents are focused on aspects such as determining the most appropriate association of stations and access points EP-B1-2263398 or the metrics required to compute and determine which associations result in improved service U.S. Pat. No. 8,442,003.

Other works have described centralised architectures that can coordinate a network of access points WO-A2-2006099025 but does not focus on aggregation of backhaul bandwidth. Furthermore, other works focus on the algorithms required for AP association US-A1-2006064497.

In many of the previous cases, links are enabled or disabled to react to changes in connectivity, that is, one of the links is down and needs to be replaced by another one. Cases where the target is creating a faster connection will mostly rely on aggregating bandwidth from various links that are permanently attached to the device.

SUMMARY OF THE INVENTION

Therefore, this invention extends the concepts explained before and provides a cloud-based solution that provides automatic discovery of available links providing a method to determine the best network layout and based on a set of preventively changes, the most performing association of existing access point in a cluster is built. The "best solution" is determined according to different metrics, being one possible option the maximum average capacity for a local neighbourhood.

According to a first aspect there is provided a method for access points scheduling for backhaul aggregation in a telecommunications network, comprising as commonly in the field: a) monitoring, by an access point in a telecommunication network, network data traffic information from at least one user computing device connected thereto; and b) detecting, by said access point, an adjacent access point in said telecommunication network available for performing backhaul aggregation.

On contrary of the known proposal, the method of the first aspect comprises: performing said steps a) and b) by a plurality of access points, said plurality of access points forming a cluster; reporting, by each access point in said cluster, an own identifier and a used public IP to a remote server recording them; establishing connections between access points in said cluster by mapping the own identifier with said public IP; determining, by each access point in said cluster, its internal status and state of the connection of said at least one monitored user computing device; generating, by each access point in said cluster, each certain time-frequency, a profile by means of said determining; calculating, by each access point in said cluster, in a determined time T1, by means of said generating a forecast of future requirements of the own access point; receiving, by one of said access point acting as a cluster coordinator, said calculated forecast from each one of the access points in the cluster; and defining, by said cluster coordinator, by means of said receiving a routing path through carrying out associations of access points in said cluster to which perform the backhaul aggregation.

Each access point may store the generated profiles during a certain period of time and further remove them upon said period of time has ended.

Preferably, the associations of access points will be carried out by considering the wireless signal of the access points. That is, access points will be associated based on WiFi visibilities. In accordance with different options, the associated access points could belong to a same sub-cluster or to a different sub-cluster of access points of said cluster. Then, once the routing path has been defined by the cluster coordinator, the access points, by means of receiving a list of preventive actions from said coordinator, will disable the established connections, detect other access points for performing backhaul aggregation and adapt to said routing path.

Because traffic conditions, neighbourhood status and user activity can evolve in a different way than has been foreseen, said calculated forecast may be compared with at least another calculated forecast, said at least calculated forecast being calculated in a time previous to said determined time T1. Then, in case said comparison is higher a certain threshold, the calculated forecast can be adjusted or replaced by triggering a set of override and fall-back actions.

The forecast will preferably include a projection of future behaviour of the access point; signal of the available access points included in the cluster and network data traffic requirements of said at least one user computing device. The time the forecast will remain valid will be limited and different options, according to different embodiments can be used in order to perform said calculation. For instance, the forecast can be calculated by taking as the generated profile for a given moment in time the last available sample at the same time of a previous day. Alternatively, mathematical procedures including moving averages, exponential smoothing or Kalman filtering can be used or even more complex operations such as a regression analysis, an artificial neural network, a support vector machines, Markov models or a machine learning technique.

Said reporting step, in an improvement of the present invention, may comprise exchanging a set of cryptographic tokens between each of said access points and said remote server. Said set of exchanged cryptographic tokens are used to provide that the received forecast is trustworthy, that is, it is ensured that an access point doesn't gain unfair advantage by injecting malicious or erroneous data.

According to a second aspect there is provided a device comprising as commonly known: means for monitoring network data traffic information from at least one user computing device connected thereto; means for detecting at least one access point available for performing backhaul aggregation; and means for establishing a control channel with at least said detected access point.

On contrary of the known proposals, the device of the second aspect further includes: means for reporting an own identifier and a public IP to a remote server; means for generating every certain time-frequency a profile; means for calculating, at least in a determined time a forecast of future requirements of the own access point; and means for acting as a cluster coordinator receiving said calculated forecast from each one of the access points in the cluster and for defining a routing path to perform the backhaul aggregation.

Said means for generating a profile in an embodiment are configured to store said generated profile during a certain period of time and to further remove them upon said period of time has ended. The device may further include means for comparing said calculated forecast in said determined time with previous calculated forecasts.

Furthermore, said means for reporting, in an improvement of the invention, are configured to exchange a set of cryptographic tokens with said remote server.

In an embodiment, the device of the second aspect is an access point forming part of a same physical entity of an associated broadband router. Alternatively, in another embodiment, said device is an access point forming part of a different physical entity of said associated broadband router.

The device of the second aspect is adapted to implement the method of the first aspect.

BRIEF DESCRIPTION OF THE DRAWINGS

The previous and other advantages and features will be more deeply understood from the following detailed description of embodiments, with reference to the attached, which must be considered in an illustrative and non-limiting manner, in which.

DESCRIPTION OF THE INVENTION

Figure 1:
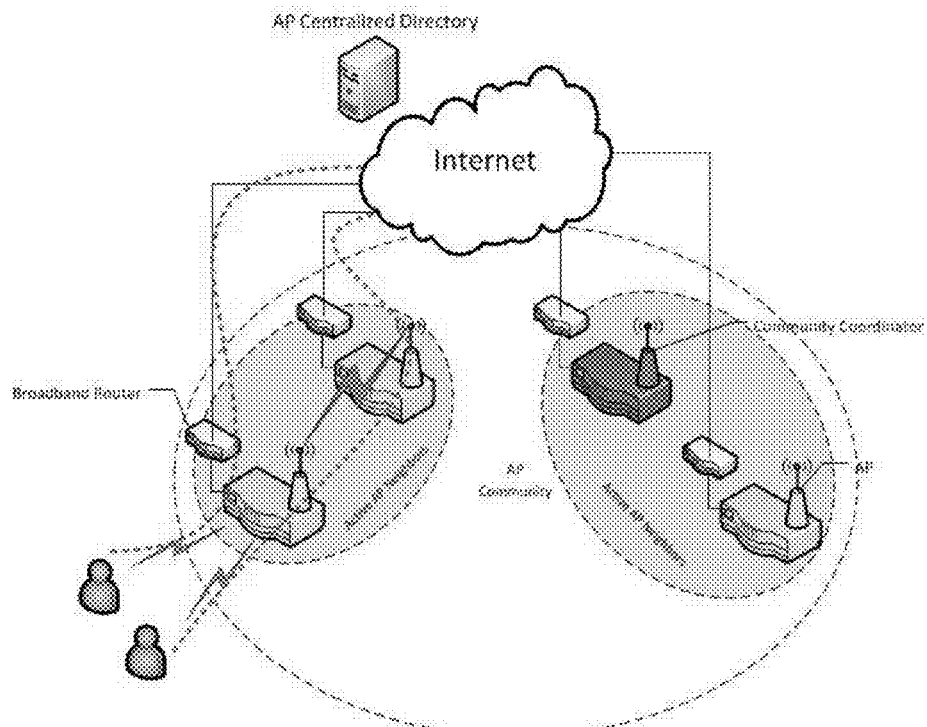
FIG. 1 is an illustration of the general architecture model used and/or implemented by the present invention.

In reference to FIG. 1, a network is composed by a set of Access points, AP as referred in the figure, where each access point is associated to a broadband router that provides the backhaul link. The division between access point and broadband router is basically logical and both entities in an embodiment could be implemented in a single physical box.

Different access points can form an access point community or cluster and each community or cluster can contain multiple active access point neighbourhoods or sub-clusters. An active access point neighbourhood is a coordinated subset of mutually visible access points, and all the access points in a given neighbourhood are connected using a WiFi link so they can share their backhaul connectivity. Any traffic routed through an access point is sent using all the links available.

Each AP community includes one or more community coordinators or cluster coordinators. The selection of coordinator is distributed to provide scalability and fault-tolerance. It is the duty of the coordinator to instruct access points to connect in specific ways so they maximize different metrics. In the case of the present invention, without loss of generality, it will be focused on the aggregated bandwidth available to the users of the neighbourhood.

Figure 2:
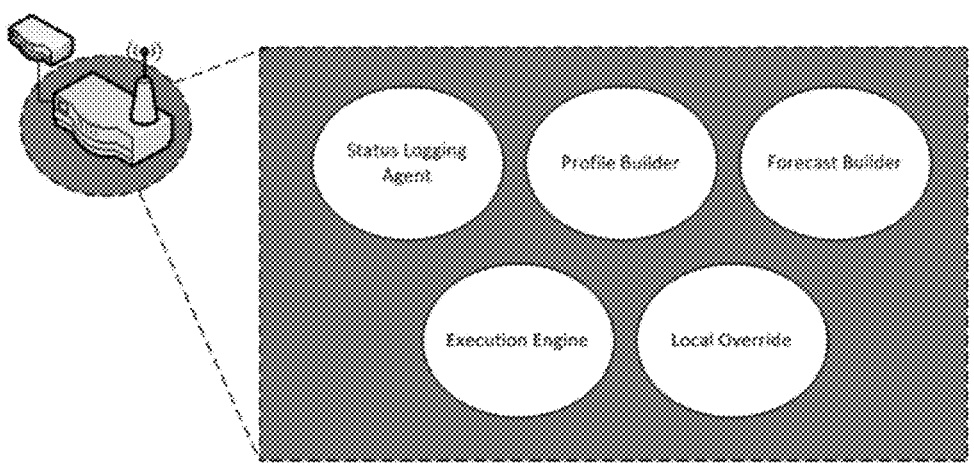
FIG. 2 is an illustration of all the different modules that a standard access point can include according to the invention.
Figure 3:
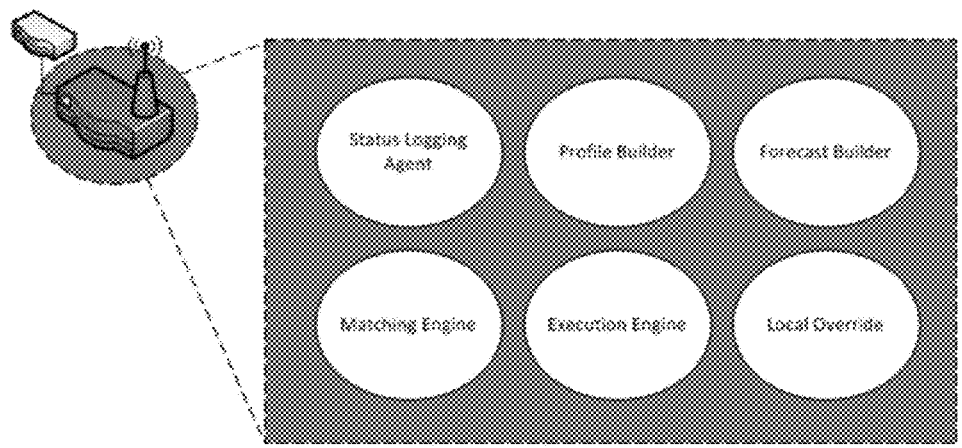
FIG. 3 is an illustration of all the different modules that a coordinator cluster access point includes according to the invention.

FIG. 2 illustrates the different modules or logic means that may run or be included in each standard access point, not a coordinator access point. The additional module that the coordinator access point includes is illustrated in FIG. 3. As can be seen, one of the differences between a standard access point and the coordinator is the existence of a matching engine module.

Each access point, according to a first aspect of the invention, registers in a remote server or AP centralized directory as illustrated in the figure. This server keeps updated record of the wireless identifier or Basic Service Set Identifier (BSSID) of each access point of said community or cluster as well as a public IP that is used to connect to the Internet. Preferably, connectivity through the BSSID is available between those access points that are in the same community and subject to characteristics of the WiFi coverage. Access points then establish wired connections using the backhaul to any other Access point of the community, by preferably mapping the BSSID to the public IP. This channel will be used to handshake, interchange status data and send/receive recommendations that will determine the wireless network layout.

Each access point, by means of a status logging agent module, is capable of periodically determining its internal status as well as determining the state of the connection of each monitored client computing device connected thereto. The responsibility of said status logging agent module is retrieving the information with certain frequency and store it locally. Preferably, data collected consist of: Information regarding local status of the access point, such as timestamp, status the backbone links is attached to, backbone link profiling (i.e.: ADSL downlink and uplink) and/or uptime; Traffic status including for instance data transferred per time-unit, amount of traffic received and forwarded through each interface, upload/download ratio, number of connections opened and/or services opening these connections; and Wireless status including BSSID of each available access point and its corresponding signal strength, BSSIDs the access point is connected to and/or number and type of devices connected to the local hotspot.

Then, a profile builder module processes all the data generated by the status logging agent module and build a profile. The profile is a snapshot that describes: operation of the access point, its WiFi neighbourhood and the traffic patterns generated by the client computing devices connected thereto. Preferably, a profile is generated every certain time-frequency (i.e. $t_{profileFreq}$ seconds).

In an embodiment, the access points may store the generated profiles during a certain period or range of time. To keep memory requirements constant, profiles older than this period of time are preferably automatically discarded or removed. Any stored profile can be retrieved for further processing.

Each snapshot accurately represents a given range of time in the past, so a profile is a lagging indicator. Temporal evolution of the behaviour of an access point regarding its connected clients and neighbours access points may be composed based on a sequence of these snapshots.

Figure 4:
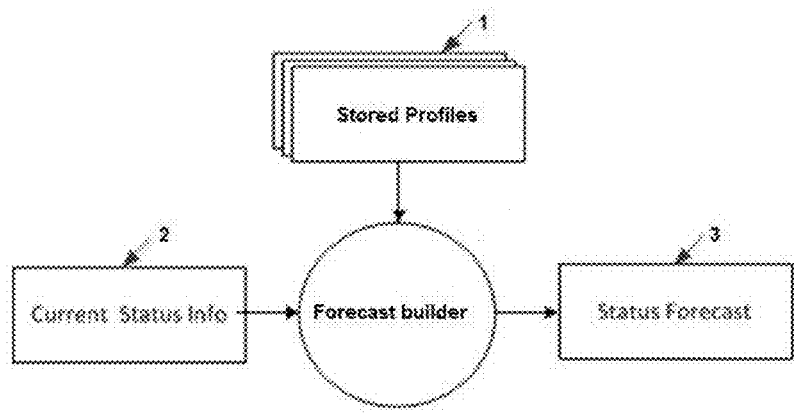
FIG. 4 illustrates the different flows or information threated by the forecast builder module in order to calculate a forecast of future requirements.

Once the profiles are generated, a forecast builder module takes a sequence of said profiles samples 1 and produces a forecast of future requirements of the access point 3 including projection of future behaviour of the access point, WiFi signal of the neighbourhoods access points and traffic requirements of the connected clients. The structure of said forecast builder is illustrated in FIG. 4

Under normal conditions, field observations indicate that user behaviour tend to be constant for periods of time ranging from a few minutes to several hours. At the same time, they are expected to change over the course of the day. These usage patterns tend to repeat daily based on the habits of the users (work hours, sleep hours, physical presence of the user, online social habits, and online events being streamed at certain times every day . . . ). The proposed method takes advantage of this knowledge and assumes the best possibility is using a network layout that is locally constant over time, but can evolve and react to changes. Anticipating changes has the benefit of providing immediate response when they happen, but forecasts have two added benefits: First, they can reduce the number of layout transitions because if the expected behaviour is similar to the current one, no action is required. Even more, if there is a succession of forecasts that suggest the scheme will evolve following a pattern that intensifies over time, the network can be configured to support a status that is more intense even if it will not be active in the immediate future. Second, knowing changes in advance allows selecting the best time to execute any corrective actions. Since changes in the topology of the network may be associated to connection drops, this approach reduces downtime and network issues.

Once a forecast has been calculated, it will be send to a community coordinator using their respective backhaul connections.

Forecasts can be calculated using different methods each one associated with varying complexity. In an embodiment, it could be taken as the estimated profile for a given moment in time, the last available sample at the same time of a previous day. This is the simplest approach proposed by the invention.

In another embodiment, the calculation process is associated with higher accuracy using different mathematical formulae such as moving averages, exponential smoothing, Kalman filtering or exponential smoothing.

In yet another embodiment, a sophisticated process may rely on regression analysis, artificial neural networks, support vector machines, Markov models, machine learning, etc.

Independently of the procedure chosen, the inputs and the outputs for the forecast builder module will remain the same. That is, input is a time series of profile samples and output is a single profile sample. The latter represents the profile that is expected to be observed at a given time in the future.

The matching engine module of the coordinator access point takes the forecasts of all the access points in the community, analyses and evaluates them and builds a set of associations. Said associations will define the routing path or topology of the network for the time the forecasts remain valid to perform the backhaul aggregation.

Figure 5:
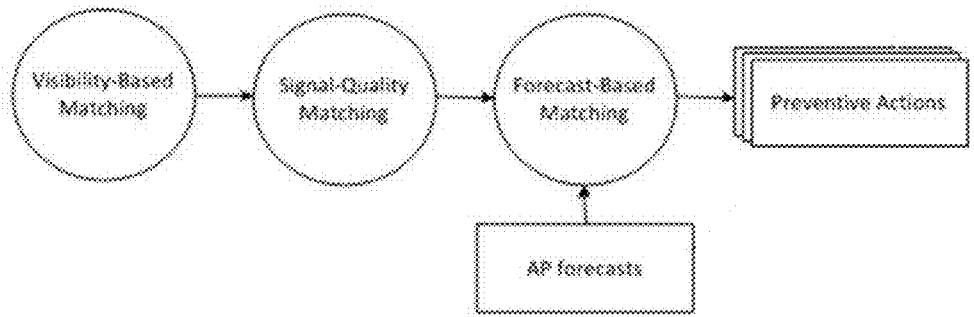
FIG. 5 illustrates the different information considered by the matching engine module of a coordinator cluster in order to define a routing path for performing backhaul aggregation.

FIG. 5 illustrates the different rules in which said associations may be based. Access points will preferably be associated based on their current WiFi visibilities. That is, access points that are mutually visible will be grouped in an access point neighbourhood or sub-cluster. By visible, it is meant, "Its WiFi signal is strong enough to be usable". However, that doesn't mean that all the access points in a neighbourhood will necessarily be connected together. There are certain conditions such as physical distance, signal strength, noise, etc. that determine the maximum speed that can be achieved in a WiFi network, hence pairs of access points whose connections will result in poor performance may be split in different neighbourhoods.

In an improvement, the invention, because each access point produces inputs for the matching engine module in a distributed fashion can contain an anti-cheating mechanism that ensures an access point gaining unfair advantage by injecting malicious data (i.e. forecasts that have been inflated so more resources are allocated to its client's devices). In consequence, said handshake between each access point and the remote server checks the identity of each access point. This is preferably done by means of the exchange of a set of cryptographic tokens with each access point registered. These cryptographic tokens will be used to sign and cypher the communication that take place between the access points and the community coordinator.

Those associated access points will produce sets of access points whose expected user experience is the best possible. The metric to optimize ensures that, most of the time, the expected bandwidth requirements for any clients associated to an access point are lower than the aggregated bandwidth available as a result of the association. Knowing the projections and capabilities for each access point, this becomes a search problem that is NP-complete. In the present invention case, the number of access points is expected to be small (max. a few dozen devices in each neighbourhood) and matches remain constant for minutes to hours. This allows the community coordinator to find the optimal associations for all the neighbourhoods by following a brute force approach.

The execution engine module of each access point once a list of preventive actions is received from said matching engine module allows its execution at the right time. Each preventive action may involve disabling existing links, as well as negotiating new WiFi connections with neighbours' access points as well as adapting the routing accordingly. The time to execute actions can be altered by the access points to avoid disruption in the service or ignored in favour of a more distant forecast. In essence, the access points decide whether an action is immediately executed, altered or ignored.

Traffic conditions, neighbourhood status and user activity can evolve in a different way than has been predicted. In this case, any preventive actions will try to optimize a metric that does not correspond to the real status of the proposed method, and probably will generate a degraded experience. Therefore, in an embodiment, to solve these cases, the access point may also include a local override module that uses the data collected by the logging agent module, simulates a forecast of the current time and compares it to the one produced in the past. If the difference is too big, according to a certain threshold, it will trigger a set of override and fall-back actions to meet custom demand that will adjust or replace the received ones.

The present invention allows a temporal optimization performing in a better way and produces an improved user experience than the one provided by the local ADSL connection alone, and better or equal than a random association between access points. Therefore, it avoids situations like, having two heavy users (users that attached to a given access point can consume all its available bandwidth) connected to the same neighbourhood. That is, their two access points are completely saturated and neither of them can experience a better service than the one provided by their individual Internet connections. In this case, the method will try to assign each of them to a different neighbourhood.

It also avoids situations where the users connected to a given access point can generate so many connections that cannot be accepted by a single backhaul connection. In this case, part of the traffic can be diverted to a secondary access point that can process part of the load.

Furthermore, in cases where load is temporally localised, that is, requests peak at a certain time when other access points are usually idle, associations can be established temporally and return to the previous state once rush hour is gone.

The proposed method takes advantage of past knowledge and assumes the best possibility is using a network layout that is locally constant over time, but can evolve and react to changes. Anticipating changes allows fast responses, can reduce the number of layout transitions and reduce the impact of any configuration changes.

A small part of the computation takes place in a remote server, but this does not limit scalability. Most of the storage and computation takes place in each community coordinator.

The scope of the invention is given by the appended claims and all variations and equivalents which fall within the range of the claims are intended to be embraced therein.

The invention claimed is:

1. A method for scheduling backhaul aggregation in a telecommunications network performed by a plurality of access points that form a cluster, the method comprising:
    monitoring, by each access point in said cluster, at least network data traffic information from at least one user computing device connected thereto;
    detecting, by each access point in said cluster, at least one adjacent access point in said telecommunication network available for performing said backhaul aggregation;
    reporting, by each access point in said cluster, to a remote server for recording, an own identifier and a public IP used by said access point;
    establishing connections between said plurality of access points in said cluster by mapping the own identifier with said public IP;
    determining, by each access point in said cluster, an internal status of said access point and a state of a connection of said at least one monitored user computing device;
    generating, at a predetermined frequency, by each access point in said cluster, a profile using said determining;
    calculating, by each access point in said cluster, at a predetermined time T1, using said generating, a forecast of future requirements of the access point;
    comparing said calculated forecast with at least another calculated forecast, said at least another calculated forecast having been calculated in a time previous to said predetermined time T1, and adjusting said calculated forecast in response to said comparison being higher than a certain threshold;
    receiving, by one of said plurality of access points in said cluster acting as a cluster coordinator, said calculated forecast from each one of the plurality of access points in the cluster; and
    defining, by said cluster coordinator, using said receiving, a routing path through carrying out associations of said plurality of access points in said cluster by which to perform the backhaul aggregation,
    wherein each access point in said cluster stores said generated profiles during a predetermined period of time and further removes said generated profiles upon said predetermined period of time having ended.

2. The method according to claim 1, wherein the forecast includes a projection of future behaviour of the access point, a signal of available access points included in the cluster, and network data traffic requirements of said at least one user computing device.

3. The method according to claim 2, further comprising calculating said forecast by:
    taking as said generated profile for a given moment in time a last available sample at a same time of a previous day; or
    using mathematical procedures including moving averages, exponential smoothing, or Kalman filtering; or
    using a regression analysis, an artificial neural network, support vector machines, Markov models, or a machine learning technique.

4. The method according to claim 1, wherein said reporting comprises exchanging a set of cryptographic tokens between each of said plurality of access points and said remote server.

5. The method according to claim 4, wherein said set of exchanged cryptographic tokens are used to provide that said received forecast is trustworthy.

6. The method according to claim 1, wherein said associations of said plurality of access points are carried out considering a wireless signal of each of said plurality of access points.

7. The method according to claim 6, wherein said associated access points belong to a same sub-cluster of access points of said cluster.

8. The method according to claim 6, wherein said associated access points belong to a different sub-cluster of access points of said cluster.

9. The method according to claim 1, wherein each access point upon said routing path being defined is configured to disable said established connections, detect other access points for performing backhaul aggregation, and adapt to said routing path.

10. A device, comprising:

a hardware processor configured to:

monitor network data traffic information from at least one user computing device connected to the device;

detect at least one access point available for performing backhaul aggregation;

establish a control channel with at least said detected access point;

report an own identifier and a public IP to a remote server;

generate, at a predetermined frequency, a profile;

calculate, at least at a predetermined time, a forecast of future requirements of the access point;

compare said calculated forecast with at least another calculated forecast, said at least another calculated forecast having been calculated in a time previous to said predetermined time, and adjusting said calculated forecast in response to said comparison being higher than a certain threshold; and act as a cluster coordinator receiving said calculated forecast from each one of the access points in a cluster and for defining a routing path to perform the backhaul aggregation, wherein said hardware processor is further configured to store said generated profiles during a predetermined period of time and to remove said generated profiles upon said predetermined period of time having ended.

11. The device according to claim 10, wherein said hardware processor is further configured to exchange a set of cryptographic tokens with said remote server.

12. The device according to claim 10, wherein said device is an access point forming part of a same physical entity or of a different physical entity of an associated broadband router.

* * * * *